United States Patent
Fedrick

(10) Patent No.: US 10,807,014 B2
(45) Date of Patent: Oct. 20, 2020

(54) SNOW MOLD

(71) Applicant: Kevin Randall Fedrick, Fort Washington, MD (US)

(72) Inventor: Kevin Randall Fedrick, Fort Washington, MD (US)

( * ) Notice: Subject to any disclaimer, the term of this patent is extended or adjusted under 35 U.S.C. 154(b) by 190 days.

(21) Appl. No.: 15/265,571

(22) Filed: Sep. 14, 2016

(65) Prior Publication Data

US 2018/0071649 A1    Mar. 15, 2018

(51) Int. Cl.
| | |
|---|---|
| *A63H 33/00* | (2006.01) |
| *B29C 39/00* | (2006.01) |
| *B29C 39/02* | (2006.01) |
| *B29C 39/26* | (2006.01) |
| *F25C 3/00* | (2006.01) |
| *B29L 31/00* | (2006.01) |
| *B29L 31/52* | (2006.01) |

(52) U.S. Cl.
CPC ......... *A63H 33/001* (2013.01); *B29C 39/003* (2013.01); *B29C 39/02* (2013.01); *B29C 39/26* (2013.01); *F25C 3/00* (2013.01); *B29L 2031/529* (2013.01); *B29L 2031/722* (2013.01)

(58) Field of Classification Search
None
See application file for complete search history.

(56) References Cited

U.S. PATENT DOCUMENTS

| | | | | |
|---|---|---|---|---|
| 1,350,084 | A | * 8/1920 | Schub | E04G 17/045 24/19 |
| 1,906,882 | A | * 5/1933 | Perret | A23G 1/21 249/137 |
| 3,061,572 | A | 10/1962 | Packer | |
| 4,164,341 | A | * 8/1979 | McComb | A63H 33/001 249/126 |
| 5,632,926 | A | 5/1997 | Dyer, Jr. | |
| 5,851,415 | A | * 12/1998 | Thomas | A23G 9/221 249/117 |
| D503,125 | S | * 3/2005 | Federic | D11/121 |
| 7,963,500 | B1 | 6/2011 | Holiday | |
| 8,753,161 | B1 | * 6/2014 | Van Denburgh, III | A63H 33/00 446/70 |
| 2016/0114254 | A1 | * 4/2016 | Diaz | A63H 33/001 249/126 |

* cited by examiner

*Primary Examiner* — Matthew J Daniels
*Assistant Examiner* — Mohammad M Ameen
(74) *Attorney, Agent, or Firm* — Baker McKenzie LLP

(57) ABSTRACT

A snow mold includes a front snow mold portion and a back snow mold portion. The back mold portion is operable to be coupled to the front mold portion by inserting protrusions disposed on a flange of the back mold portion into receptacles disposed on a flange of the front mold portion. The front and back mold portions may be coupled by rotation of a rotatable fastener.

12 Claims, 6 Drawing Sheets

100

300

300

SNOW MOLD

BACKGROUND

Making snowmen and other snow sculptures has long been a winter past time for both children and adults alike. A compact snowball is made by hand and rolled around the ground to be coated with additional snow. The snowball is rolled until the ball reaches a desired size for the lower body of the snowman and placed at a desired location. Another snowball is then rolled and inflated in the same way, until this second snowball reaches a desired size for the head of the snowman. The head is lifted, placed on top of the body, and the snowman is decorated at the discretion of the sculptor.

The above described conventional method of making a snowman has several drawbacks. First, the method is labor intensive. While rolling the snowball, the snow can become very heavy, and lifting the head portion to the top of the body may cause injuries if not carefully performed. Second, the quality of the snow may make packing snow by hand and creating a snowball difficult. When rolling the snowball, placing too much pressure onto an improperly packed snowball may cause it to crumble and break. Rolling the snowball on the ground also causes it to pick up dirt and debris. Third, the conventional method requires much time and effort to make a single snowman. Due to physical demands and uneven conditions, it is very difficult to replicate and make multiple identical snowmen. Lastly, decorating the snowman is usually limited to rocks, tree branches, and old clothing. Sculpting the snow so that the snowman appears to have expanded features is often time consuming and may even lead to the snowman's collapse.

It is desirable to be able to make a snowman safely and easily, without requiring the lifting of heavy and compacted snow and with an improved appearance. It is also desirable to be able to make a snowman quickly so that multiple snowman can be made in a short period of time.

BRIEF SUMMARY

The present disclosure generally relates to a mold for making a snow sculpture. In one exemplary embodiment, snow mold includes a first mold portion, a second mold portion, and a rotatable fastener. The first mold portion includes a first flange. At least a portion of a side of the first mold portion defines a first mold cavity. The first flange includes a plurality of extensions extending from the side of the first mold portion. The second mold portion includes a second flange. At least a portion of a side of the second mold portion defines a second mold cavity. The second flange includes a plurality of receptacles extending from the side of the second mold portion. The rotatable fastener is coupled to one of the first flange and the second flange. The fastener is operable to couple the first mold portion and the second mold portion by rotating the fastener when the first and second flanges are positioned next to each other.

In another example, a method of creating a snow object using a snow mold, comprising: providing a first mold portion including a first flange, at least a portion of a side of the first mold portion defining a first mold cavity, and the first flange including a plurality of extensions extending from the side of the first mold portion; providing a second mold portion including a second flange, at least a portion of a side of the second mold portion defining a second mold cavity, and the second flange including a plurality of receptacles extending from the side of the second mold portion; positioning the first mold portion and the second mold portion such that the plurality of extensions couple the plurality of receptacles; rotating each of a plurality of fasteners coupled to one of the first flange and the second flange to couple the first and second mold portions; inserting snow into a first mold cavity of a first mold portion; and inserting snow into a second mold cavity of a second mold portion.

DETAILED DESCRIPTION

Various aspects of a snowman mold according to the present disclosure are described. It is to be understood, however, that the following explanation is merely exemplary in describing the devices and methods of the present disclosure. Accordingly, any number of reasonable and foreseeable modifications, changes, and/or substitutions are contemplated without departing from the spirit and scope of the present disclosure.

Figure 1:
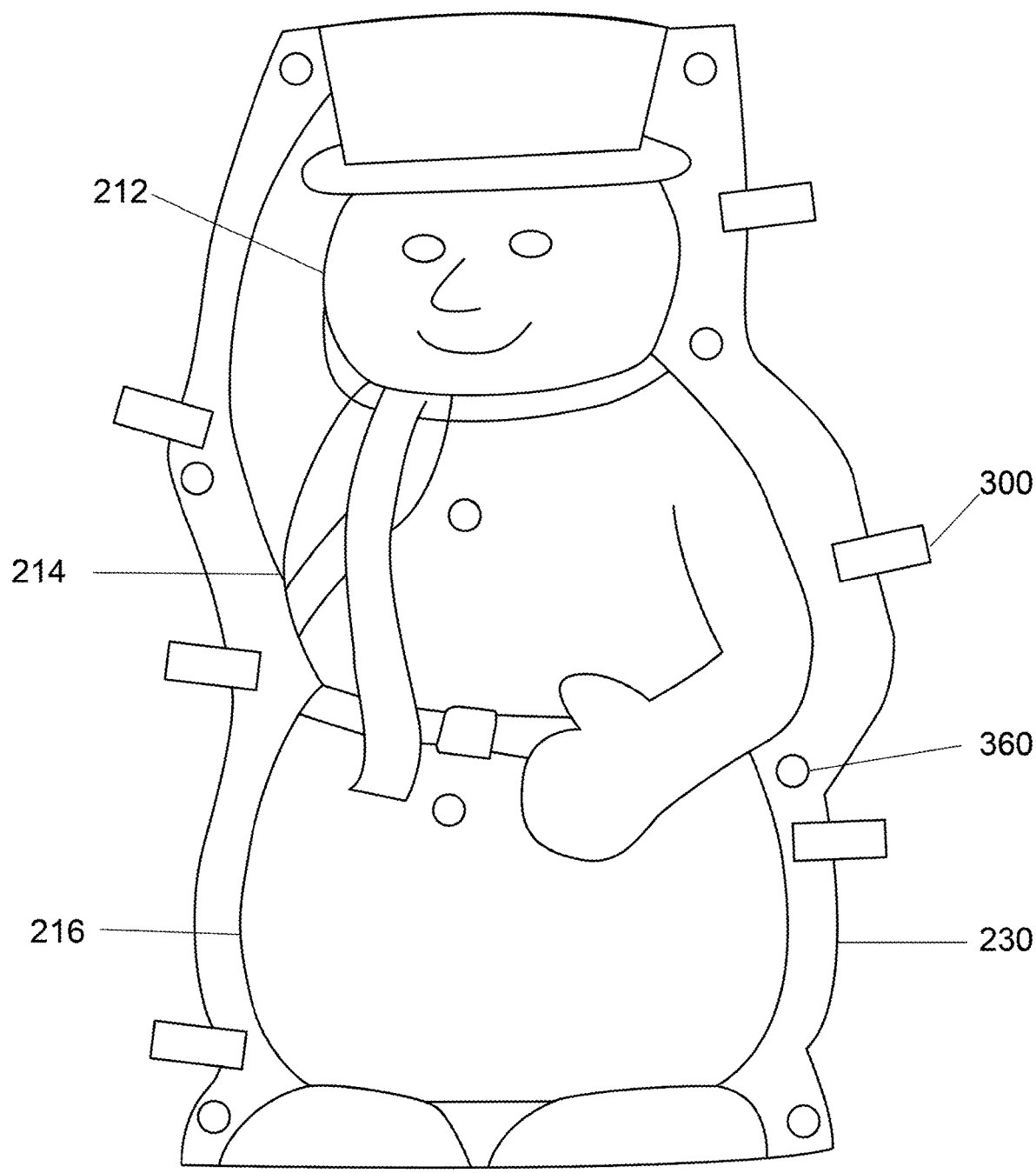
FIG. 1 illustrates a front view of a first portion of a snow mold.
Figure 2:
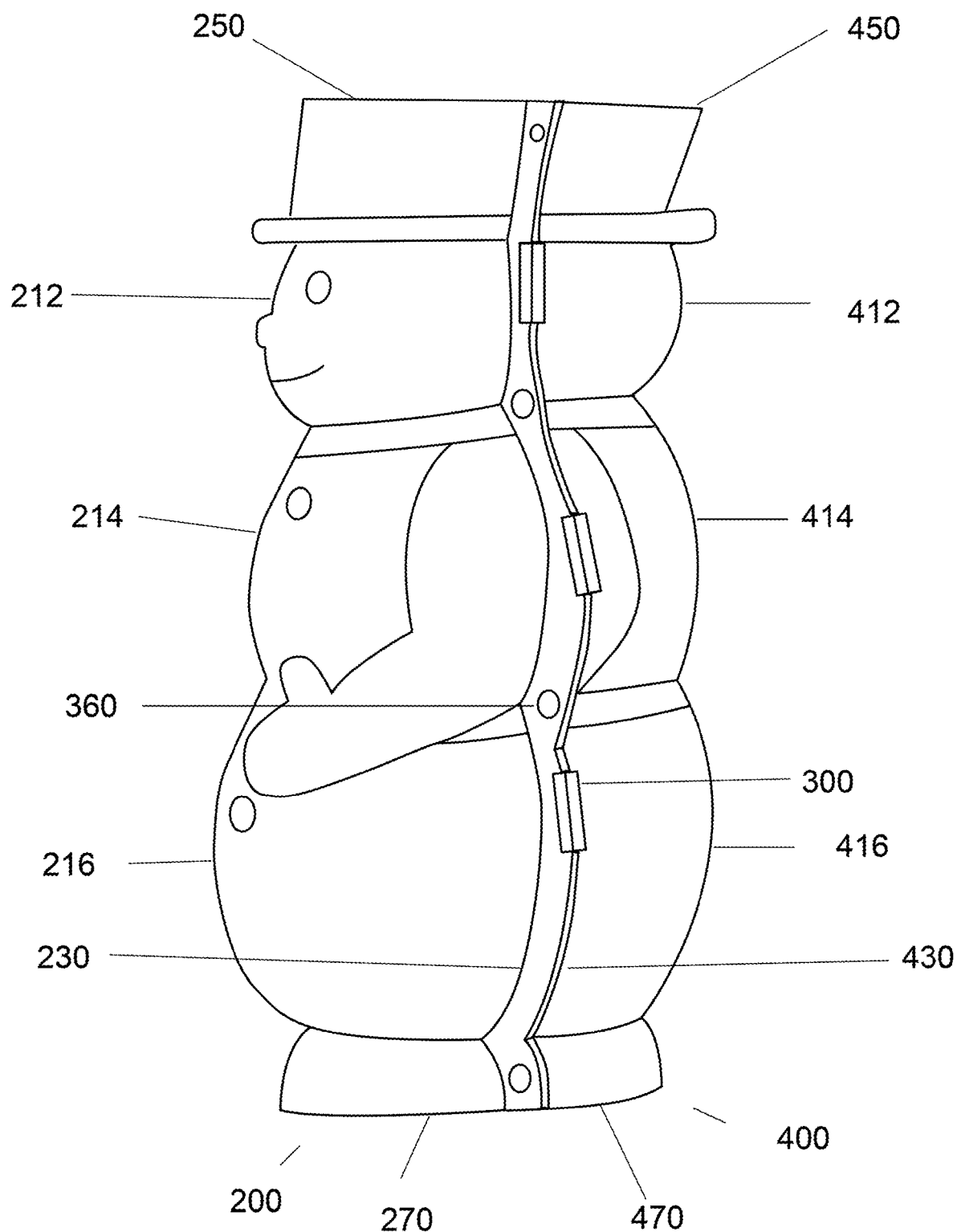
FIG. 2 illustrates a side perspective view of the snow mold.
Figure 3:
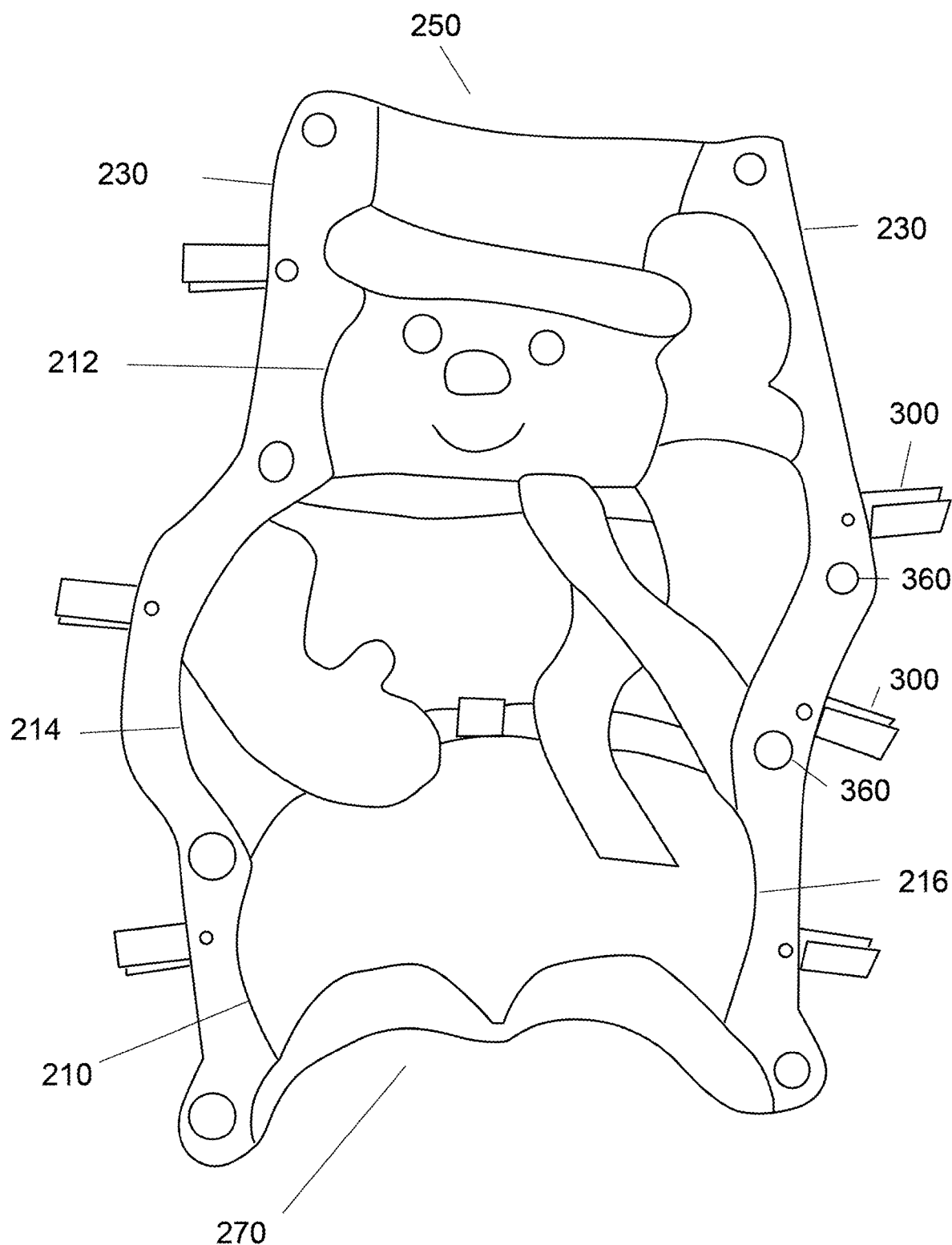
FIG. 3 illustrates a back view of the first portion of the snow mold.
Figure 4:
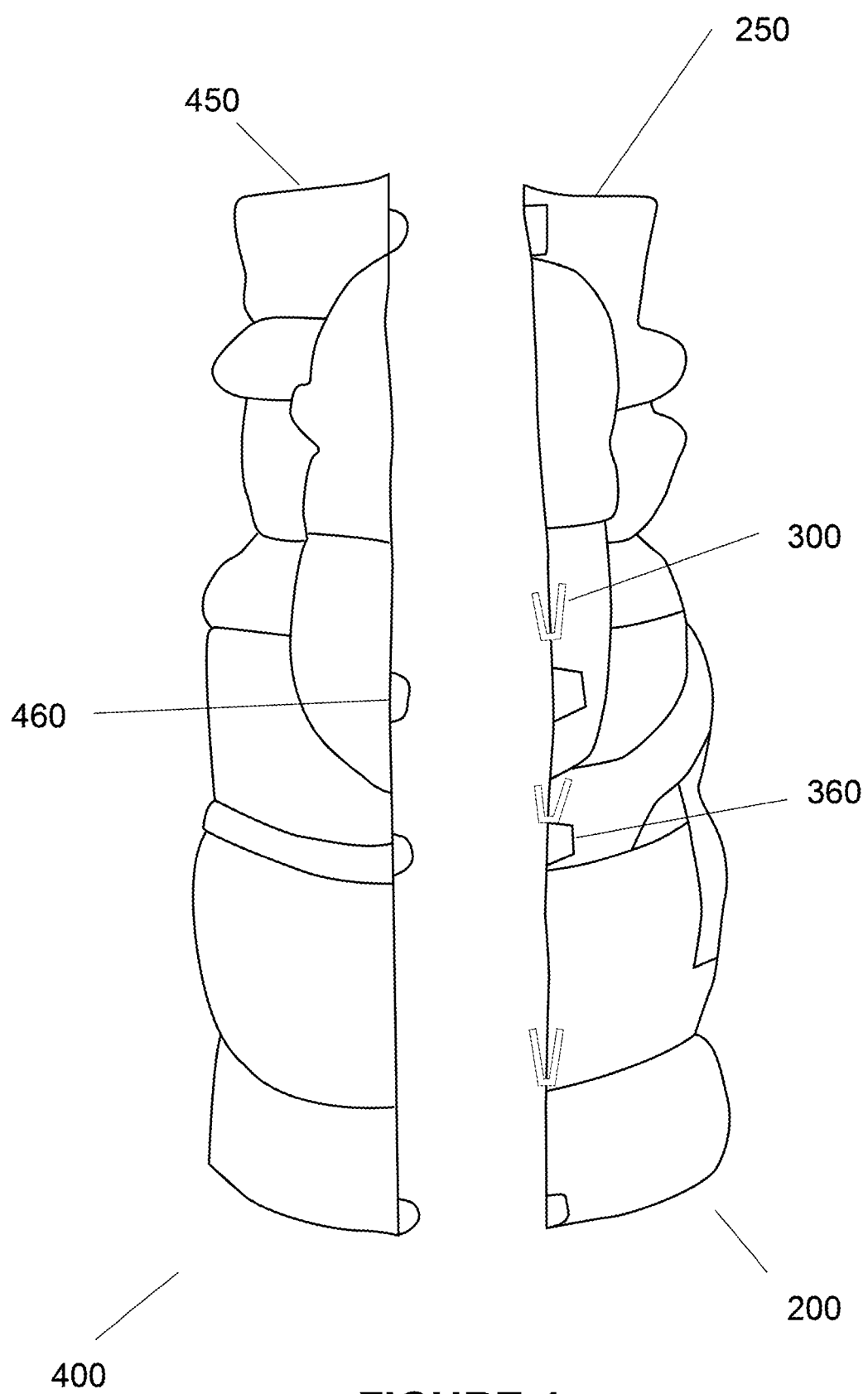
FIG. 4 illustrates a right side view of the snow mold.
Figure 5:
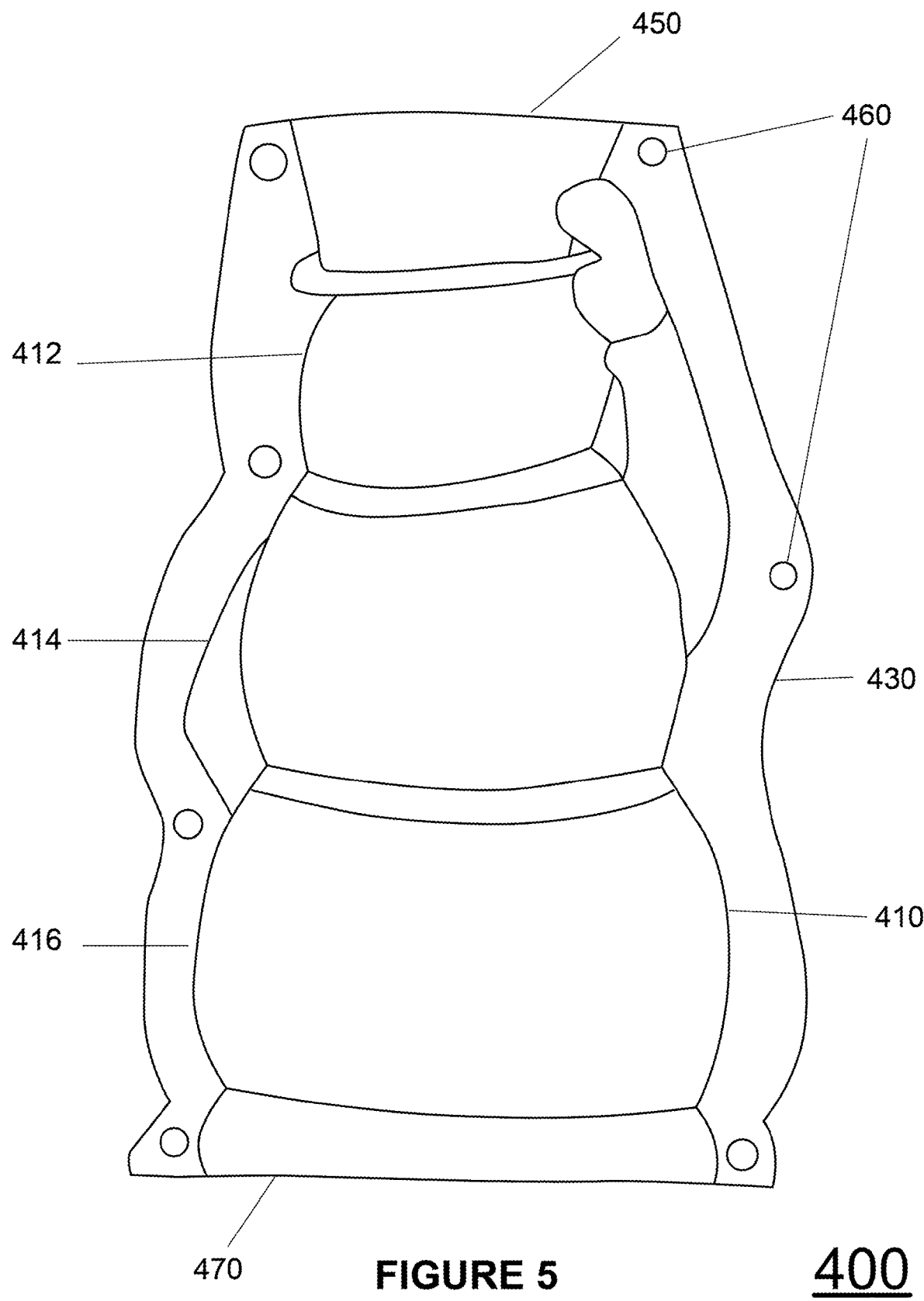
FIG. 5 illustrates a back view of a back portion of the snow mold.
Figure 6A:
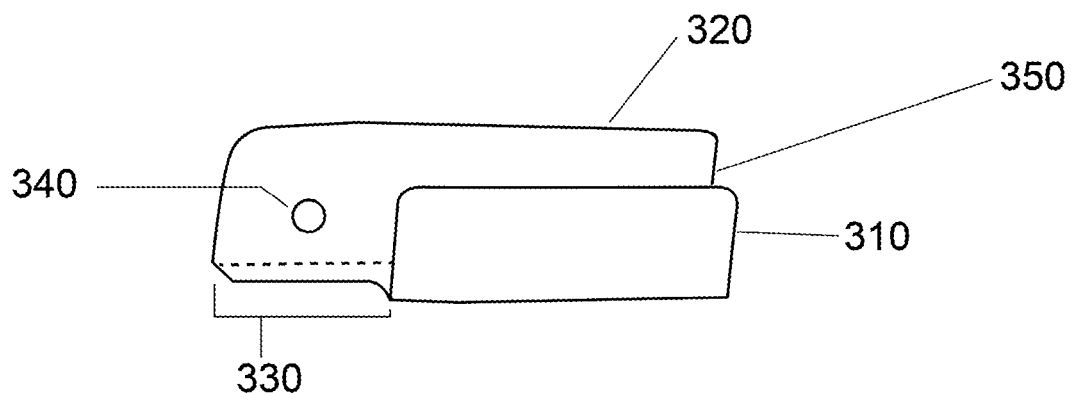
FIG. 6A illustrates a side perspective view of a fastener of the snow mold.
Figure 6B:
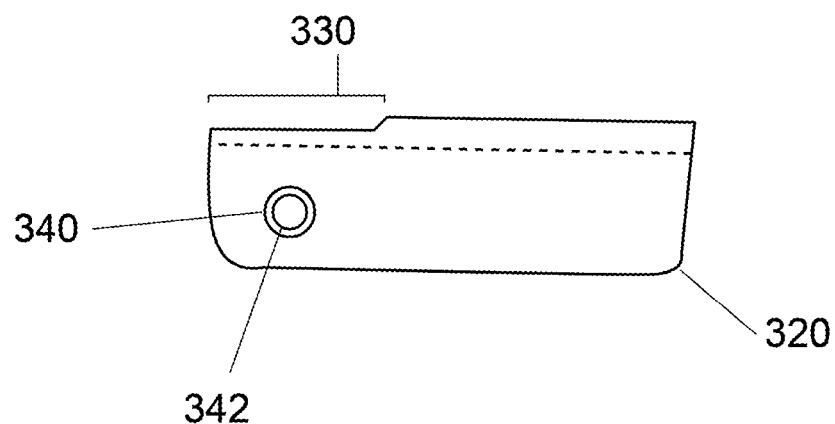
FIG. 6B illustrates a top perspective view of the fastener of the snow mold.

Referring to FIGS. 1-6B, a snowman mold 100 includes a front mold half 200 and a back mold half 400. The front mold half 200 includes a front mold cavity 210, a front flange 230, a top opening 250 and a bottom opening 270. The front mold cavity 210 is generally used to receive snow and mold snow to the shape of a front side of a snowman. To that end, the front mold cavity 210 may include a head portion 212, torso portion 214, and lower portion 216. The head portion 212 may include mold cavities for a snowman's eyes, nose, a mouth, or a top hat. The torso portion 214 may further include mold cavities for a snowman's hands, arms, buttons, scarf, or a tie. The lower portion 216 may include mold cavities for a snowman's pants, legs, or shoes. In a particular embodiment, the front mold cavity 210 is a cavity in the shape of the front side of a smiling snowman wearing a scarf, with its right arm raised and right hand on the brim of a tilted top hat, and its left arm by its left side and left hand on its belt. The front mold half 200 and back mold half 400 may each be constructed from one piece of material, without requiring openings at the front mold cavity 210 or the back mold cavity 410. This may be desirable so that when snow is inserted into the mold, it is not forced out of the mold through openings in the mold. The front mold half 200 and the back mold half 400 may be made from polyurethane, plastic, metal, or other suitable materials. The front mold half 200 and the back mold half 400 may be distinct and separate from each other and not be connected to each other so as to require minimum space when stored.

The front flange 230 may be disposed on the sides of the front mold cavity 210, and may conform substantially to the outer shape of the front mold cavity 210 so as to provide a user with an easy grip of the mold. The front flange 230 may be flat and may easily constructed from mold overflow during front mold half 200 construction. The front flange 230 may form an angle with the interior of the front mold cavity 210. In an example, the angle may be approximately 90 degrees.

In some embodiments, the top opening 250 and bottom opening 270 of the front mold half 200 do not include the front flange 230 because a flange at the bottom may prevent the snowman mold from standing up right, and flange at the top may obstruct the top opening 250 where snow would be inserted. The front flange 230 may further include one or more fasteners 300, disposed at particular locations along the front flange 230. In an embodiment, three fasteners 300 are disposed on the front flange 230 on the right side of the snowman, and three fasteners 300 are disposed on the front flange 230 on the left side of the snowman. The front flange 230 may further include one or more pin receptacles 360 disposed at particular locations along the front flange 230. In the current embodiment, three pin receptacles 360 are disposed on the front flange 230 on the right side of the snowman, and four pin receptacles 360 are disposed on the front flange 230 on the left side of the snowman. The receptacles may be, for example, a recessed cavity or hole defined in the front flange 230.

The back mold half 400 includes a back mold cavity 410, a back flange 430, a top opening 450 and a bottom opening 470. The back mold cavity 410 is generally used to receive snow and mold the snow into the shape of a back side of the snowman. To that end, the back mold cavity 410 may include a head portion 412, a torso portion 414, and a lower portion 416. The head 412, torso 414, and lower 416 portions of the back mold cavity 410 generally correspond to the head 212, torso portion 214, and lower 216 portions of the front mold cavity 210 respectively. When the molds halves 200 and 400 are placed together, the back mold cavity 410 and the front mold cavity 210 form a three-dimensional outline of a snowman.

The back flange 430 of the back mold half 400 may be disposed on the sides of the back mold cavity 410, and may conform substantially to the outer shape of the back mold cavity 410 so as to provide an easy grip of the mold. The back flange 430 may be flat and may easily be constructed from mold overflow during back mold portion 400 construction. The back flange 430 may form an angle with the interior of the back mold cavity 410. In an example, the angle may be approximately 90 degrees.

In some embodiments, the top opening 450 and the bottom opening 470 of the back mold half 400 do not include the back flange 430 because a flange at the bottom may prevent the snowman mold from standing up right, and flange at the top may obstruct the top opening where snow would be inserted. The back flange 430 of the back mold half 400 further includes one or more pins 460. The one or more pins 460 may be formed by extending a portion of the back flange 430 so as to create a protrusion. The protrusion is then used as a pin, and can be inserted into the one or more pin receptacles 360 of the front flange 230. The pins 460 may further include tapered tips so as to be easily insertable. Each of the one or more pins 460 is located on the back flange 430 at a position corresponding to the location of each of the one or more pin receptacle 360 of the front mold half 200.

Particularly when the pins 460 include the tapered tips, insertion of the pins 460 into the pin receptacles 360 allows for quick and easy alignment of the mold halves. When the front flange 230 and the back flange 430 are substantially flat and formed at angles to the front mold cavity 210 and the back mold cavity 230, faces of the front flange 230 and the back flange 430 may meet substantially in contact when the pins 460 are inserted into the pin receptacles 360. Thus may provide an interior mold space with limited, or even without, a seam in the resulting snow mold.

The number of pin receptacles 360 and the number of pins 460 may be the same. In an embodiment, three pins 460 are disposed on the flange 430 on the right side of the snowman and four pins 460 are disposed on the flange 430 on the left side of the snowman, each pin 460 being located at a location that corresponds to a respective pin receptacle 360 disposed on the flange 230 on the front mold half 200. This uneven distribution of pins (four pins on left side, three pins on left side) is advantageous when the snowman holds an asymmetrical pose such as when the snowman's right arm is raised and the right hand is posed to tilt its top hat and the snowman's left arm is placed near the snowman's left side, and its left hand touching its belt. Because of this asymmetrical pose, the amount of space available on the front flange 230 for the fasteners 300 and the pin receptacles 360 is different on each side of the snowman. There is an uneven distribution in the number of pins and pin receptacles on the flange.

A method of assembling the snowman mold will now be discussed. The method includes using the one or more fasteners 300 and the one or more pins 460 to secure the front mold half 200 to the back mold half 400. When secured, it is desirable that the mold halves do not move horizontally or vertically away from each other, especially when snow is inserted into the mold through the top or bottom openings.

The one or more fasteners 300 may each be a piece of metal, plastic, or mold material that is formed into a substantially U-shape. The one or more fasteners 300 may include a short flap 310 and a long flap 320. The long flap 320 extends beyond the short flap 310 by an attachment portion 330. The attachment portion 330 may include an aperture 340 that is used to movably attach the fastener 300 to one of the either front flange 230 or back flange 430. The short flap 310 and long flap 320 form the two sides of an U-shape, with a set spacing 350 in between. Both the front flange 230 of the front mold portion 200 and the back flange 430 of the back mold portion 400 may be inserted and secured into the spacing 350.

To attach the front mold half 200 to the back mold half 400, the front flange 230 is matched up against the back flange 430. Since the flanges are substantially similar in shape, it is easy to match the edges of each flange according to size and shape. Once matched, each pin 460 of the back mold half 400 is inserted into the respective pin receptacle 360 of the front mold half 200. Since each pin 460 is located on the back flange 430 at a corresponding location as each respective pin receptacle 360 is located on the front flange 230, all pins are easily inserted into respective pin receptacles. When each pin is fully inserted into the respective receptacle, the front flange 230 and back flange 430 adjoin, and the front mold cavity 210 and back mold cavity 410 create a three dimensional mold cavity in the shape of a snowman.

A method of securing the front mold half 200 to the back mold half 400 using the one or more fasteners 300 will now be described. A fastener 300 may be attached to the front flange 230 at the attachment portion 330. In an embodiment, a rivet 342 is inserted through the aperture 340 and operable to secure the fastener 300 onto the front flange 230. In this manner, the fastener 300 is unlikely to be misplaced in normal usage or storage of the snowman mold, and is an improvement over molds using separate and detachable fasteners. In another embodiment, the rivet 342 may be a screw, bolt, a one way non-reversible screw, or other coupling mechanism that allows the fastener 300 to be rotated about the aperture 340. A rotatable fastener also has the exemplary benefit of reducing mechanical strain as compared to a folding joint. Thus, the coupling mechanism may experience less fatigue and may have a longer life.

Prior to engaging the fastener 300 to secure the front mold half 200 to the back mold half 400, the fastener 300 may be placed in a disengaged position so as to not get in the way of attaching the front mold half 200 to the back mold half 400 using the pins 460. While in the disengaged position, the fastener 300 is positioned so that the short flap 310, being shorter than the long flap 320, does not obstruct the back mold half 400 from attaching to the front mold half 200. Specifically, the fastener 300, while attached to the front flange 230 via the long flap 320, maintains a gap with the short flap 310 so that the back flange 430 may be attached to the front flange 230. Once the back mold half 400 is attached to the front mold half 200 and pins 460 are inserted into respective and corresponding pin receptacles 360, the fastener 300 can be engaged. To engage, the fastener 300 is rotated about the aperture 340. The edges of the front flange 230 and back flange 430, being attached together, are inserted into the spacing 350 that is formed between the long flap 320 and short flap 310. The fastener 300 is fully engaged when the edges of the combined front flange 230 and back flange 430 touches the bottom of the "U" of the U-shaped fastener 300, so that the fastener 300 rests parallel to the edge of the edges of the flanges. When the fastener 300 is fully engaged, the front flange 230 and the back flange 430 are secured against each other. This is because the spacing 350 of the fastener 300 is small relative to the thickness of the combined front flange 230 and back flange 430. The fastener 300 therefore exerts a force that presses the flanges 230 and 430 together. Once the one or more fasteners 300 on each side of the snowman mold are fully engaged, the front mold half 200 will be securely fastened to the back mold half 400 by the front flange 230 and back flange 430. The snowman mold is now assembled.

To disassemble the snowman mold, the one or more fasteners 300 are disengaged and placed back into a disengaged position. To do so, each of the fasteners 300 may be rotated around each fastener's aperture 340, so that the front and back flanges are no longer within the spacing 350 of the fastener 300. Then, the back mold half 400 is pulled away from the front mold half 200 until at least when the pins 460 are no longer resting in their respective pin receptacles 360. At this point, the snowman mold is disassembled.

There are multiple methods of producing a snowman using the snowman mold described above. In a first method, snow is placed and compacted into the front mold cavity 210. Snow is also placed and compacted into the back mold cavity 410. Then, the mold is assembled by attaching and securing the front mold half 200 and the back mold half 400 according to the procedure described above. The assembled snowman mold, with the snow already inside the mold, is placed at a desired location. Additional snow may be added into the mold cavity through an open top formed by the front mold half's top portion 250 and the back mold half's top portion 450. In a particular embodiment, the open top is located at a circular top crown of the snowman's top hat, where the front mold half top portion 250 defines a first half of the circular top and the back mold half top portion 450 defines a second half of the circular top. The open top may be the size of the circular top crown of the top hat, and may have a diameter substantially corresponding to the width of each of the front and back mold cavities. After snow is added into the mold and compacted by pressing down on the snow through the open top, the mold can be disassembled according to the procedure described above. When the front mold half 200 is detached from the back mold half 400, a snowman figure is revealed.

In a second method of making a snowman, the snowman mold is first assembled by attaching and securing the front mold half 200 to the back mold half 400 according to the procedure described above. The mold is then placed at a desired location, and snow is placed into the mold through the open top. As snow is added, it is compacted by reaching through the mold open top and pressing down on the snow. Once snow is filled to the open top of the assembled mold, the mold may be disassembled according to the procedure described above. When the front mold half 200 is detached from the back mold half 400, a snowman figure is revealed.

The above described snowman mold include many advantageous features that are absent from current snowman toys. For example, the snowman mold includes the front flange 230 and the back flange 430, where the flanges extend from opposite sides of the front mold cavity 210 and back mold cavity 410. The flanges are flat and may easily be inserted into one or more fasteners 300, may easily be constructed from mold overflow, and also conform substantially to the shape of the mold halves 200 and 400 so as to decrease the amount of material needed to manufacture the snowman mold. In addition, referring to FIG. 6, one or more fasteners 300 are pre-installed and remain coupled to the front flange 230. This is so that the fasteners 300 are less likely to fall off the mold and get lost in the snow when the snowman mold is used, and the user is less likely to misplace and lose the fasteners during storage. The fasteners 300 are also structured to include a long flap 320 and a short flap 310. Advantageously, the short flap 310 does not obstruct the back flange 430 from attaching to the front flange 230, and the flaps can be easily pivoted to engage and fasten the flanges together. The pivot-type fasteners 300 are also superior to other types of fasteners used to secure molds because the fasteners 300 are easily engaged and disengaged by rotating about where the long flap 320 is coupled to the front flange 230. The flanges 230 and 430 may also include one or more pin-receptacle pairing, where the pins, once inserted into a corresponding receptacle, may prevent the mold halves from moving vertically with respect to each other. The pins may be tapered so as to be easily inserted, and the pin-receptacle pairing help the user to align the mold halves so that the user can be sure that the back mold half 400 is correctly aligned with the front mold half 200.

While an embodiment of the snow mold and related methods of making a snowman have been described above, it should be understood that they have been presented by way of example only, and not limitation. While the snow mold may include one or more fasteners coupled to the front flange, the one or more fasteners may also be coupled to the back flange depending the desire of the manufacturer. In addition, the one or more pins may extend from any one of the front or back flanges, and one or more pin receptacles may be disposed at the other of the front or back flanges. Snow may also be inserted through the bottom openings of the first and second mold portions as well as through the top openings of the first and second mold portions. The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, the claims should not be limited by the language chosen under a heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

The invention claimed is:

1. A snow mold, comprising:
   a first mold portion including a first flange, at least a portion of a side of the first mold portion defining a first mold cavity, the first mold cavity being asymmetrical and continuously solid from top to bottom and side to side, and the first flange including a first number of extensions extending from a first side of the first flange and a second number of extensions extending from a second side of the first flange, the first and second numbers of the extensions being unevenly distributed around the first side of the first flange and the second side of the first flange so as to compensate for the asymmetry of the first mold cavity;
   a second mold portion including a second flange, at least a portion of a side of the second mold portion defining a second mold cavity, the second mold cavity being asymmetrical and continuously solid from top to bottom and side to side, and the second flange including a first number of receptacles extending from a first side of the second flange and a second number of receptacles extending from a second side of the second flange for receiving corresponding extensions of the first flange, the first and second numbers of receptacles being unevenly distributed around the first side of the second flange and the second side of the second flange so as to compensate for the asymmetry of the second mold cavity; and
   a first plurality of rotatable fasteners coupled to the first side of the first flange and a second plurality of rotatable fasteners coupled to the second side of the first flange, the first plurality of fasteners being not detachable from the first side of the first flange and located on different horizontal planes than the second plurality of fasteners so as to compensate for the asymmetry of the first and second mold cavities, the second plurality of fasteners being not detachable from the second side of the first flange, and the first and second plurality of fasteners being operable to couple the first mold portion and the second mold portion by rotating the first and second plurality of fasteners when the first and second flanges are positioned next to each other;
   wherein the asymmetry of the first mold and the asymmetry of the second mold allows for the snowman to holds an asymmetrical pose when a right arm of the snowman is raised and a right hand of the snowman is posed to tilt a top hat and a left arm is placed near a left side of the snowman, and a left hand of the snowman is touching a belt of the snowman.

2. The snow mold of claim 1, wherein the first mold cavity defines a frontside of a three-dimensional snowman.

3. The snow mold of claim 1, wherein the second mold cavity defines a backside of a three-dimensional snowman.

4. The snow mold of claim 1, wherein when the first and second flanges are positioned next to each other, the side of the first mold portion and the side of the second mold portion together define a top opening operable to receive material into the first and second mold cavities.

5. The snow mold of claim 4, wherein the top opening is substantially circular and defines a top crown of a top hat of the snow mold.

6. The snow mold of claim 1, wherein said first flange conforms substantially to an outer contour of the first mold cavity, and the second flange conforms substantially to an outer contour of the second mold cavity.

7. The snow mold of claim 1, wherein the receptacles includes recesses defined in the second flange.

8. The snow mold of claim 1, wherein the receptacles includes holes defined in the second flange.

9. The snow mold of claim 1, wherein the extensions include protrusions of the first flange.

10. The snow mold of claim 9, wherein the protrusions are tapered.

11. The snow mold of claim 1, wherein the rotatable fastener includes a long flap and a short flap.

12. The snow mold of claim 1, wherein the rotatable fastener is coupled to the first flange by a rivet.

* * * * *